US011030125B2

(12) United States Patent
Brown et al.

(10) Patent No.: US 11,030,125 B2
(45) Date of Patent: *Jun. 8, 2021

(54) POINT IN TIME COPY OPERATIONS FROM SOURCE VOLUMES TO SPACE EFFICIENT TARGET VOLUMES IN TWO STAGES VIA A NON-VOLATILE STORAGE

(71) Applicant: International Business Machines Corporation, Armonk, NY (US)

(72) Inventors: Theresa M. Brown, Tucson, AZ (US); Nedlaya Y. Francisco, Tucson, AZ (US); Suguang Li, Tucson, AZ (US); Beth A. Peterson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 690 days.

This patent is subject to a terminal disclaimer.

(21) Appl. No.: 13/759,935

(22) Filed: Feb. 5, 2013

(65) Prior Publication Data

US 2014/0223121 A1 Aug. 7, 2014

(51) Int. Cl.
*G06F 12/00* (2006.01)
*G06F 12/16* (2006.01)
*G06F 11/14* (2006.01)

(52) U.S. Cl.
CPC .......... *G06F 12/16* (2013.01); *G06F 11/1456* (2013.01); *G06F 11/1461* (2013.01); *G06F 2201/84* (2013.01)

(58) Field of Classification Search
CPC .. G06F 12/16; G06F 11/1456; G06F 11/1461; G06F 2201/84
See application file for complete search history.

(56) References Cited

U.S. PATENT DOCUMENTS 6,157,991 A * 12/2000 Amon ................. G06F 11/2064
711/161
7,124,128 B2 10/2006 Springer, Sr. et al.
7,133,989 B2 11/2006 Burton et al.
(Continued)

FOREIGN PATENT DOCUMENTS

CN 1326043 C 11/2005
CN 101154234 A 4/2008
CN 101883135 A 11/2010

OTHER PUBLICATIONS

N. Bhatnagar, et al., "Method for Improving the Host I/O Performance During Concurrent Copy", IP.com, IP.com No. IPCOM000111189D, TDB V37, N2A, 02-94, pp. 481-481, Feb. 1, 1994 (original publication and date), Mar. 26, 2005, pp. 1-3.
(Continued)

*Primary Examiner* — Gurtej Bansal
(74) *Attorney, Agent, or Firm* — Konrad Raynes Davda & Victor LLP; Rabindranath Dutta

(57) ABSTRACT

A request is received to perform a point in time copy operation from a source volume to a space efficient target volume. A controller copies data stored in a group of data storage units, from the source volume to a non-volatile storage, to preserve the point in time copy operation. A background process asynchronously copies the data from the non-volatile storage to the space efficient target volume to commit a physical point in time copy of the data from the source volume to the target volume.

20 Claims, 9 Drawing Sheets

(56) References Cited

U.S. PATENT DOCUMENTS

| 7,587,564 | B2 | | 9/2009 | Lorenz et al. |
| 8,001,085 | B1 | * | 8/2011 | Kiselev ................... 707/639 |
| 2004/0186968 | A1 | | 9/2004 | Factor et al. |
| 2004/0260736 | A1 | * | 12/2004 | Kern .................. G06F 11/2058 |
| 2004/0260869 | A1 | | 12/2004 | Factor et al. |
| 2004/0260902 | A1 | * | 12/2004 | Stanley ............... G06F 11/2058 711/165 |
| 2005/0251634 | A1 | * | 11/2005 | Burton et al. ................ 711/162 |
| 2008/0040553 | A1 | | 2/2008 | Ash et al. |
| 2008/0077629 | A1 | * | 3/2008 | Lorenz .................. G06F 3/0608 |
| 2010/0191925 | A1 | | 7/2010 | Blount et al. |
| 2010/0028733 | A1 | | 11/2010 | An |
| 2014/0223081 | A1 | | 8/2014 | Brown et al. |

OTHER PUBLICATIONS

"I/O Priority Management for Copy Services Relationships", IP.com, IP.com No. IPCOM0001198983D, Aug. 19, 2010, pp. 1-5.
Office Action dated Jun. 12, 2015, pp. 18, for U.S. Appl. No. 14/071,529, filed Nov. 4, 2013.
Preliminary Amendment dated Nov. 4, 2013, pp. 6, for U.S. Appl. No. 14/071,529, filed Nov. 4, 2013.
Response dated Sep. 14, 2015, pp. 7, to Office Action dated Jun. 12, 2015, pp. 18, for U.S. Appl. No. 14/071,529, filed Nov. 4, 2013.
Final Office Action dated Nov. 5, 2015, pp. 21, for U.S. Appl. No. 14/071,529, filed Nov. 4, 2013.
Response dated Feb. 5, 2016, pp. 8, to Final Office Action dated Nov. 5, 2015, pp. 21, for U.S. Appl. No. 14/071,529, filed Nov. 4, 2013.
Office Action dated Apr. 22, 2016, pp. 16, for U.S. Appl. No. 14/071,529, filed Nov. 4, 2013
Chinese Office Action dated May 11, 2016, pp. 8, for Serial No. 201410041400.7, filed Jan. 28, 2014.
Information Materials for IDS document dated May 23, 2016, pp. 2, re Chinese Office Action dated May 11, 2016, pp. 8, for Serial No. 201410041400.7, filed Jan. 28, 2014.
U.S. Pat. No. 7,133,989 is the English counterpart of CN1326043.
U.S. Pat. No. 7,587,564 is the English counterpart of CN101154234.
U.S. Publication No. 2010287338 is the English counterpart of CN10883135.
English machine translation of CN1326043.
English machine translation of CN101154234.
English machine translation of CN10883135.
Response dated Jul. 22, 2016, pp. 8, to Office Action dated Apr. 22, 2016, pp. 16, for U.S. Appl. No. 14/071,529, filed Nov. 4, 2013.
Final Office Action dated Sep. 22, 2016, pp. 21, for U.S. Appl. No. 14/071,529, filed Nov. 4, 2013.
Response dated Dec. 22, 2016, pp. 11, to Final Office Action dated Sep. 22, 2016, pp. 21, for U.S. Appl. No. 14/071,529, filed Nov. 4, 2013.
Office Action dated Jan. 13, 2017, pp. 17, for U.S. Appl. No. 14/071,529, filed Nov. 4, 2013.
Response dated Apr. 23, 2017, pp. 12, to Office Action dated Jan. 13, 2017, pp. 17, for U.S. Appl. No. 14/071,529, filed Nov. 4, 2013.
Final Office Action dated Jul. 27, 2017, pp. 20, for U.S. Appl. No. 14/071,529, filed Nov. 4, 2013.
Notice of Appeal dated Oct. 27, 2017, pp. 2, for U.S. Appl. No. 14/071,529.
Pre-Appeal Brief Request for Review dated Oct. 27, 2017, pp. 7 for U.S. Appl. No. 14/071,529.
Pre-Appeal Brief Conference Decision dated Dec. 6, 2017, pp. 2, to U.S. Appl. No. 14/071,529.
Appeal Brief dated Mar. 7, 2018, pp. 26, for U.S. Appl. No. 14/071,529.
Examiner's Answer to Appeal Brief dated Jun. 28, 2018, pp. 6, for U.S. Appl. No. 14/071,529.
Reply Brief dated Aug. 18, 2018, pp. 12, for U.S. Appl. No. 14/071,529.
Appeal Docketing Notice dated Sep. 6, 2018, pp. 2, for U.S. Appl. No. 14/071,529.
Patent Board Decision Examiner Reversed dated Nov. 14, 2019, pp. 7, for U.S. Appl. No. 14/071,529.
Office Action dated Feb. 18, 2020, pp. 16, for U.S. Appl. No. 14/071,529.
Reponse dated May 18, 2020, pp. 9, to Office Action dated Feb. 18, 2020, pp. 16, for U.S. Appl. No. 14/071,529.
Response dated Oct. 2, 2020, pp. 9, to Final Office Action dated Jul. 2, 2020, pp. 22, for U.S. Appl. No. 14/071,529.
Final Office Action dated Jul. 2, 2020, pp. 22, for U.S. Appl. No. 14/071,529.
Notice of Allowance dated Feb. 18, 2021 pp. 14, for U.S. Appl. No. 14/071,529.

* cited by examiner

600

Source Destage Intercept – target is standard volume
- if the track is on a source volume
    - if the target volume is standard volume
        - for (# of tracks to be grouped for destage)
            - Is Copy source to target (CST) needed?
                - stage source track into cache segments for the target *(this stage may include several tracks.)*
                - destage track *(this will include all the tracks that were staged.)*
                - commit destage
                - update the target bitmap

Source Destage Intercept – target is track space efficient (TSE) volume
- if the track is on a source volume
    - if the target volume is TSE,
        - for (# of tracks to be grouped for destage)
            - Is CST needed?
                - stage source track into cache segments for the target *(this is always single track stage)* — 602
                - allocate free space in the space efficient repository
                - destage track *(this is always single track destage)* — 604
                - commit destage
                - Update multiple metadata tracks to indicate where the track has been copied.
                - update the target bitmap
        - stop grouping on the source destages

FIG. 6

POINT IN TIME COPY OPERATIONS FROM SOURCE VOLUMES TO SPACE EFFICIENT TARGET VOLUMES IN TWO STAGES VIA A NON-VOLATILE STORAGE

BACKGROUND

1. Field

The disclosure relates to a method, system, and article of manufacture for performing point in time copy operations from source volumes to space efficient target volumes in two stages via a non-volatile storage.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage controller may provide point in time, full volume copies of data, with the copies available for read or write access. A point in time copy is a fully usable copy of a defined collection of data that contains an image of the data at a single point in time. The copy is considered to have logically occurred at that point in time, but implementations may perform part or all of the copy to a target storage device at other times as long as the result is a consistent copy of the data as it appeared at that point in time. It may be noted that the physical copy is considered complete at the point at which all the tracks in a copy relationship are copied to disks or other storage devices on the target.

Point in time copy operations create a copy of a source volume on the target volume. The copy is called a point in time copy. When a point in time copy operation is initiated, a point in time copy relationship is created between a source volume and target volume. A point in time copy relationship is a mapping of the source volume and a corresponding target volume. This mapping allows a point in time copy of that source volume to be copied to the corresponding target volume.

In certain situations, the target volumes are space efficient volumes. In space efficient volumes, the space for volumes are allocated when the point in time copy operations actually copies tracks, extents, blocks, or other storage units to the target volumes. Without space efficient target volumes, the point in time copy operation may require that all the space on a target volume be allocated and be available even if no data is copied to the target volumes. With space efficient volumes, a point in time copy operation uses only the number of tracks that are required to write the data that is changed during the lifetime of the point in time relationship, so the allocation of space is on an as needed basis. While the target volume, in certain situations may need to be of the same size or larger in size in comparison to the source volume (as full volume copies need to allow for the maximum extents required by the size of the source volume), in many situations the space used or provisioned for the target volume may only be a fraction of the source volume. As a result, the point in time copy operation with space efficient target volumes increases the potential for a more effective use of system storage capacity.

SUMMARY OF THE PREFERRED EMBODIMENTS

Provided are a method, a system, and a computer program product in which a request is received to perform a point in time copy operation from a source volume to a space efficient target volume. A controller copies data stored in a group of data storage units, from the source volume to a non-volatile storage, to preserve the point in time copy operation. A background process asynchronously copies the data from the non-volatile storage to the space efficient target volume to commit a physical point in time copy of the data from the source volume to the target volume.

In additional embodiments, the copying from the source volume to the non-volatile storage avoids performing of operations to allocate space in the space efficient target volume before responding to the request that the point in time operation is complete, wherein the performing of operations to allocate space in the space efficient target volume is performed while asynchronously copying the data via the background process from the non-volatile storage to the space efficient target volume.

In further embodiments, the space efficient target volume is a track space efficient target volume, an extent space efficient target volume, or is based on any other representation of storage that is different from tracks or extents. In certain additional embodiments, a request to perform a write operation to a source volume is received, and in response to determining that the asynchronous copying of the data via the background process is not complete but a corresponding point in time data is present in the non-volatile storage, the write operation on the source volume is performed.

In certain embodiments, a request is received to perform a read operation on a selected space efficient target volume. In response to determining that the asynchronous copying of the data via the background process is complete, the read operation is responded to from the space efficient target volume.

In certain additional embodiments, in response to determining that the asynchronous copying of the data via the background process is in progress, a determination is made as to whether the read operation can be responded to from the non-volatile storage. In response to determining that the read operation can be responded to from the non-volatile storage, the read operation is responded to from the non-volatile storage. In response to determining that the read operation cannot be responded to from the non-volatile storage, the read operation is responded to from the source volume corresponding to the selected space efficient target volume.

In additional embodiments, the data storage units correspond to tracks, and groups of tracks are copied to the non-volatile storage during source destage intercept. The asynchronous copying further comprises destaging a track from the non-volatile storage to the space efficient target volume, updating a bitmap metadata to indicate that the track has been copied to the space efficient target volume, and demoting the track from the non-volatile storage.

BRIEF DESCRIPTION OF THE DRAWINGS

Referring now to the drawings in which like reference numbers represent corresponding parts throughout:

FIG. 6 illustrates a block diagram with programmatic steps that show single track grouping for source destage intercept in case of standard volumes and space efficient target volumes, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Performance Impact of Space Efficient Volume in Point in Time Copy

Copying of source volumes to target volumes may be time consuming. Copying to a space efficient target may be more time consuming because of the additional overhead of allocating space when needed for space efficient volumes. There may be a significant performance penalty when using space efficient volumes as target volumes of a point in time copy operation.

For space efficient volumes, the copy source to target work may involve many time consuming steps that may result in a noticeable delay to host input/output (I/O) to the source volume. Some of the steps required for space efficient volumes may include allocation of free space for the space efficient volume to store the track from a source volume, and metadata updates associated with the space efficient volumes. The additional metadata and space management requirements for space efficient volumes may impact the duration of the copy source to target for point in time operations. There may be a significant degradation of the performance in comparison to standard volumes.

Certain embodiments decrease the copy source to target time for space efficient target volumes for point in time copy operations. In certain embodiments, source tracks are not directly copied to the target volume but rather to non-volatile storage which ensures the integrity of the track being copied even though it has not yet been copied to the target volume. Once the source track has been copied and committed to the non-volatile storage, the source can consider the copy source to target to be complete. The copy from non-volatile storage to the target volume may then occur asynchronously as a background task. The entire copy source to target delay, especially to the space efficient target, is removed from host input/output (I/O).

Therefore, certain embodiments provide a two stage point in time copy operations. In the first stage (referred to as the preservation stage), data is copied to the non-volatile storage for a group of tracks, and in the second stage (referred to as the commit stage), the data is copied from the non-volatile storage to the target. The preservation stage may correspond to a logical copy corresponding to the point-in-time copy, whereas the commit stage may correspond to a physical copy to the target, and on conclusion of the commit stage the point in time copy is completed in its entirety (i.e., physical point in time copy is complete).

Exemplary Embodiments

Figure 1:
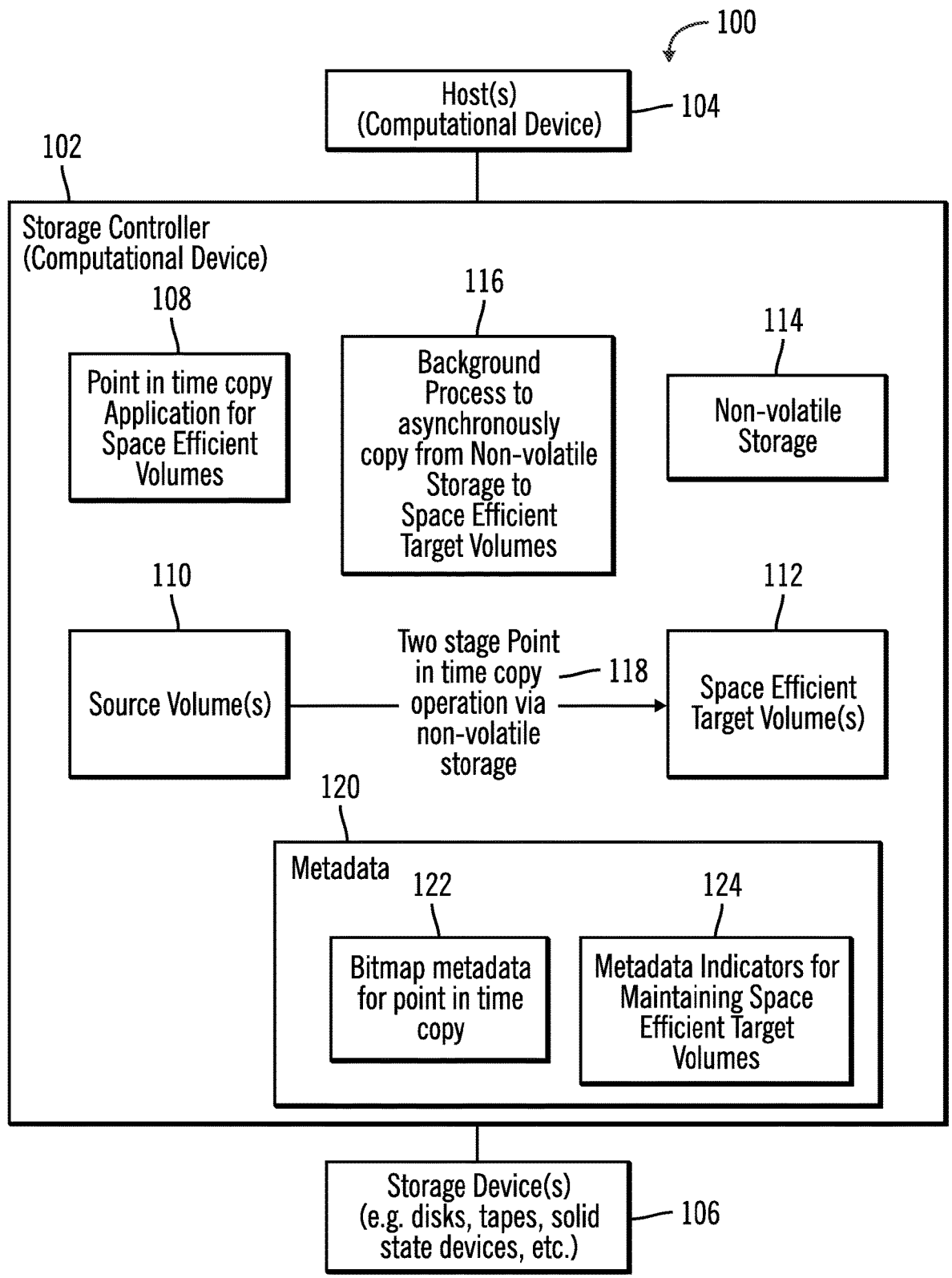
FIG. 1 illustrates a block diagram of a computing environment that includes a storage controller coupled to a host and one or more storage devices, in accordance with certain embodiments.

FIG. 1 illustrates a block diagram of a computing environment 100 that includes a storage controller 102 coupled to one or more hosts 104 and one or more storage devices 106, in accordance with certain embodiments. The storage controller 102 manages storage for the host 104, by controlling one or more storage devices 106.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The storage devices 106 may comprise any suitable storage device including those presently known in the art, such as magnetic disks, optical disks, solid stage disks, tapes, etc. In certain embodiments, the host 104, the storage controller 102, and the storage devices 106 may be coupled via a network, such as the Internet, an intranet, a storage area network, a local area network, etc.

The storage controller 102 may include a point in time copy application 108 that may be executed to perform a point in time copy operation by copying tracks or extents from source volumes 110 to space efficient target volumes 112. The source volumes 110 and the space efficient target volumes 112 are logical representations of physical volumes stored in the storage devices 106. The space efficient target volumes 112 may be track space efficient volumes when tracks are used for representing storage, and may be extent space efficient volumes when extents are used for representing storage. Other units of representation of storage may be used in alternative embodiments.

In certain embodiments, the point in time copy operations are performed (shown via reference numeral 118) in two stages by first copying tracks or extents from the source volumes 110 to a non-volatile storage 114 and then using a background process 116 to asynchronously copy the tracks or extents from the non-volatile storage 114 to the space efficient target volumes 112.

The storage controller 102 also includes metadata 120 for maintaining the space efficient target volumes 112. The metadata 120 may include bitmaps and other data structures (shown via reference numerals 122 as referred to as bitmap metadata) that show which tracks or extents have been copied or which tracks or extents have to be copied, and other metadata indicators 124 associated with managing the space requirements of the space efficient target volumes 112. In alternative embodiments, the bitmap metadata 122 may be maintained in data structures other than bitmaps. It may be noted that since space is allocated in the space efficient target volumes 112 only when such space is needed, the overhead for managing the metadata 120 may be significantly higher in certain situations in comparison to volumes that are not space efficient.

Therefore, FIG. 1 illustrates certain embodiments in which a point in time copy application 108 performs point in time copy operations in two stages by copying tracks or extents from a source volume 110 to a non-volatile storage 114 in a point in time copy preservation stage, and then copying the tracks and extents asynchronously via a background process 116 to the space efficient target volumes 112 in point in time copy commit stage.

Figure 2:
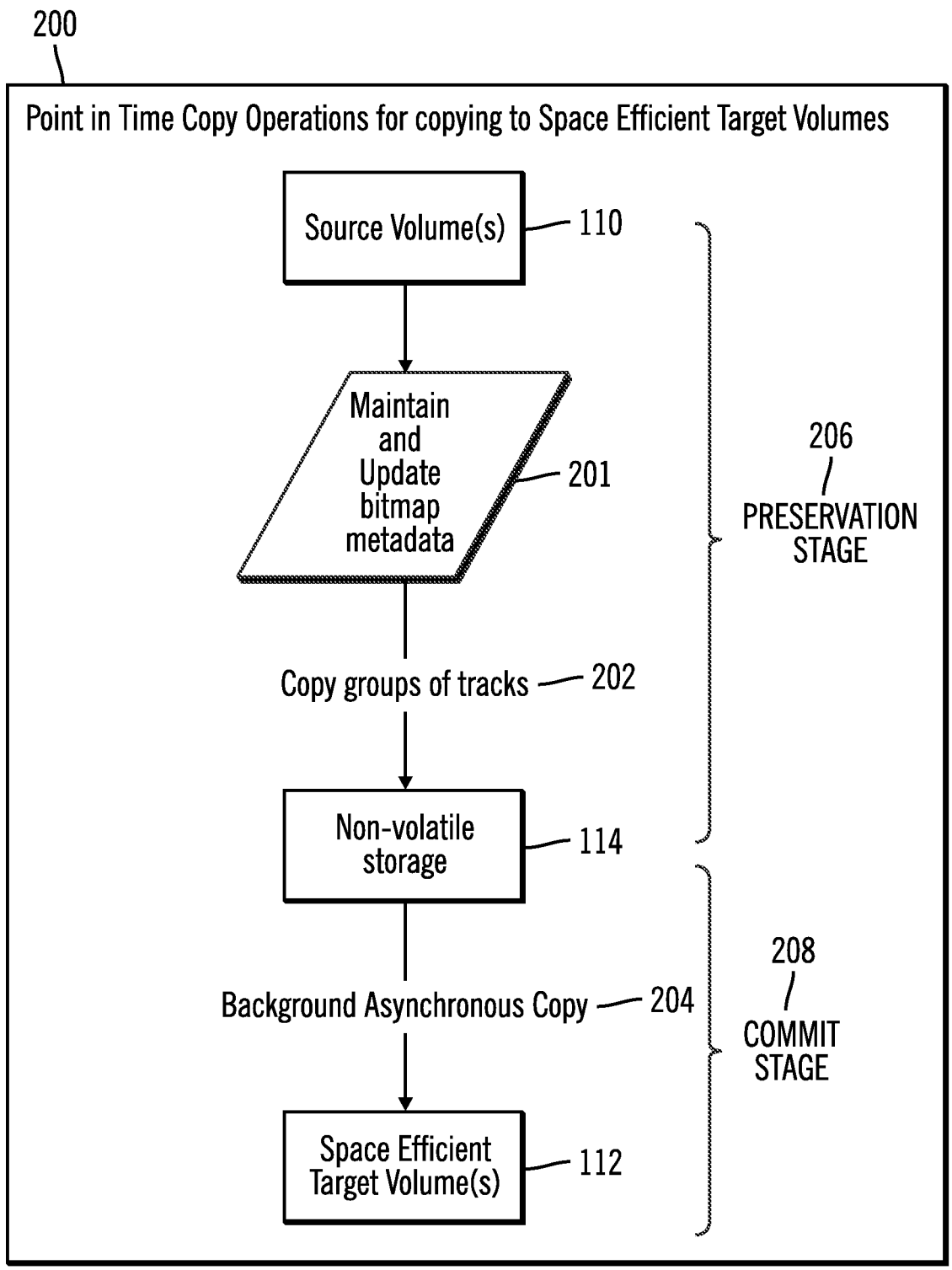
FIG. 2 illustrates a block diagram that shows point in time copy operations for copying to space efficient target volumes in two stages, in accordance with certain embodiments.

FIG. 2 illustrates a block diagram 200 that shows point in time copy operations for copying to space efficient target volumes in two stages, in accordance with certain embodiments. The operations shown in FIG. 2 may be implemented in the storage controller 102 and may be performed via the point in time copy application 108 and the background process 116.

In embodiments where the unit of representing storage is tracks, while performing point in time copy operations the bitmap metadata 122 is updated (reference numeral 201), and groups of tracks of the source volumes 110 are copied (at block 202) to the non-volatile storage 114 in the preservation stage 206, and then the tracks are copied (at block 204) via a background asynchronous copy to the space efficient target volumes 112 in the commit stage 208. On update of the bitmap metadata 122 to indicate which tracks are to be copied for point in time copy operations, an indication is sent to the host 104 that the point in time copy operation is complete (even though the physical point in time copy operation has not committed) as far as the host 104 is concerned and information stored in the bitmap metadata 122 is used to copy tracks to the non-volatile storage 114.

Therefore, the point in time copy operation is performed in two stages: a preservation stage 206, and a commit stage 208. In the preservation stage 206, the point in time copy is preserved by copying tracks to the non-volatile storage 114 and the point in time copy is preserved even though physical copies have not been made to the space efficient target volumes 112. In the commit stage 208, the data is copied from the non-volatile storage 114 to the space efficient target volumes 112 to commit the point in time copy operation, where the commit of the point in time copy operations means that the point in time copy operation is complete, i.e., physical copies to the target have been completed.

Therefore, FIG. 2 illustrates certain embodiments in which point in time copy operations do not cause the host 104 to wait for completion of I/O operations. The source volumes 110 may cause a response to be sent to the host 104 that the point in time copy operation is complete on update of the bitmap metadata 122 to store the tracks that will undergo point in time copy, or in alternative embodiments as soon as the tracks are copied to the non-volatile storage 114. Read and write requests may also be responded to without any significant delay. The process of copying to non-volatile storage 114 is faster in comparison to copying directly to the space efficient target volumes 112 as the overhead associated with the management of space efficient volumes is avoided.

Subsequently, the background asynchronous copy that may be relatively time consuming is used to copy the tracks from the non-volatile storage 114 to the space efficient target volumes 112.

Figure 3A:
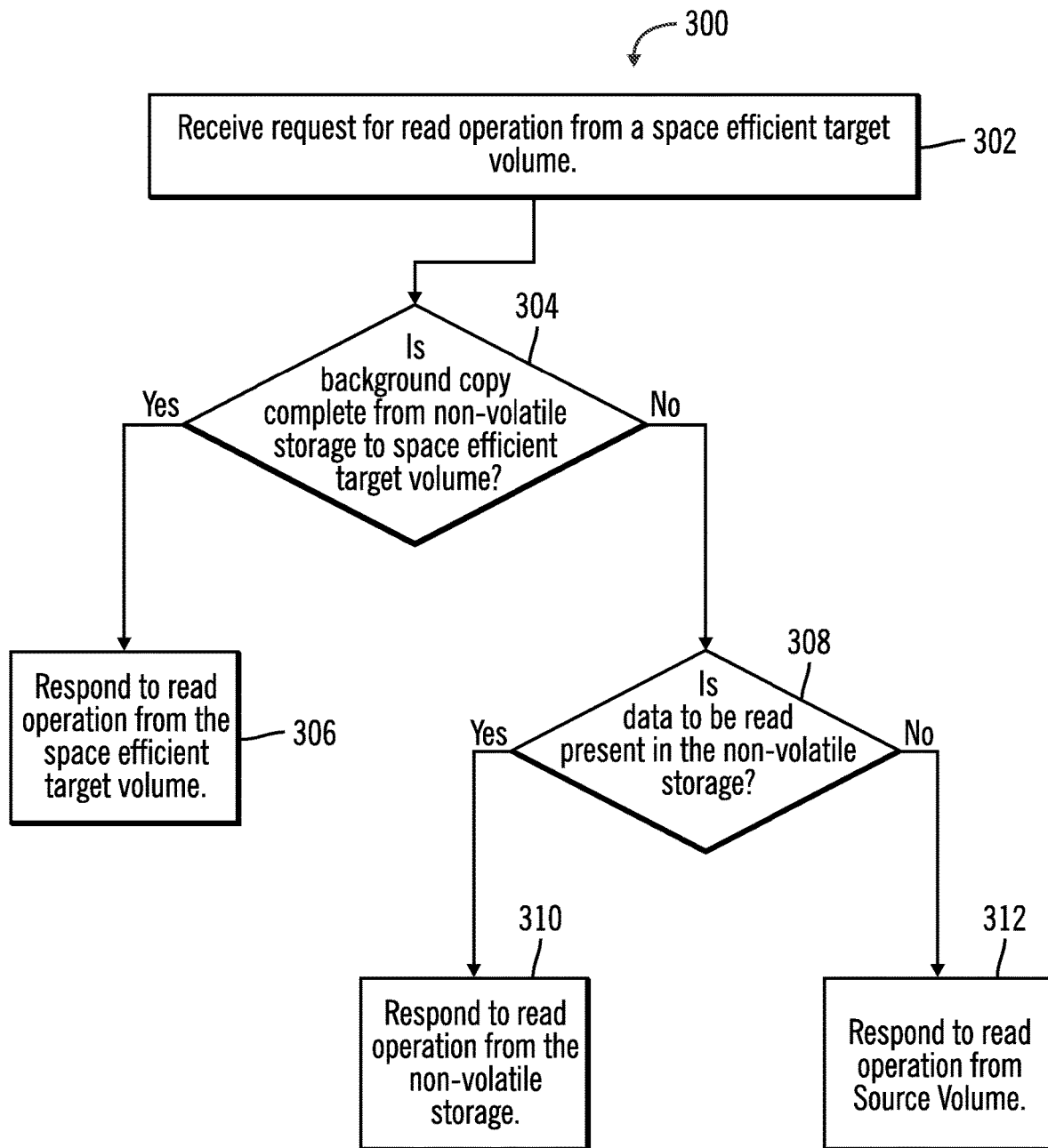
FIG. 3A illustrates flowchart that shows how responses are made to a request received for a read operation from a space efficient target volume, in accordance with certain embodiments.

FIG. 3A illustrates a flowchart 300 that shows how responses are generated to a request received for a read operation from a space efficient target volume, in accordance with certain embodiments. The operations shown in FIG. 3A may be implemented in the storage controller 102 and may be performed by additional applications besides the point in time copy application 108 and the background process 116 that may be implemented in the storage controller 102.

Control starts at block 302 in which a request is received for a read operation from a space efficient target volume 112. A determination is made (at block 304) as to whether the background copy from the non-volatile storage 114 to the space efficient target volume 112 has been completed. If so ("Yes" branch from block 304), control proceeds to block 306 and the read request is responded to by providing data from the space efficient target volume 112 as the space efficient target volume is 112 is consistent with source volume 110.

If at block 304 it is determined that background copy from the non-volatile storage 114 to the space efficient target volume 112 has not been completed ("No branch from block 304) control proceeds to block 308 where a determination is made as to whether the data to be read is present in the non-volatile storage 114 (i.e., whether the non-volatile storage 114 is consistent with the source volume 110). If so ("Yes" branch from block 308), the read operation is responded to by providing (block 310) data from the non-volatile storage 114. If not ("No" branch from block 308) then the read operation is responded to by providing (block 312) data from the source volume 110.

Therefore, FIG. 3A illustrates certain embodiments in which read requests from target volumes may be responded to with data from the source volumes, non-volatile storage, or target volumes depending on where the data is consistently stored.

Figure 3B:
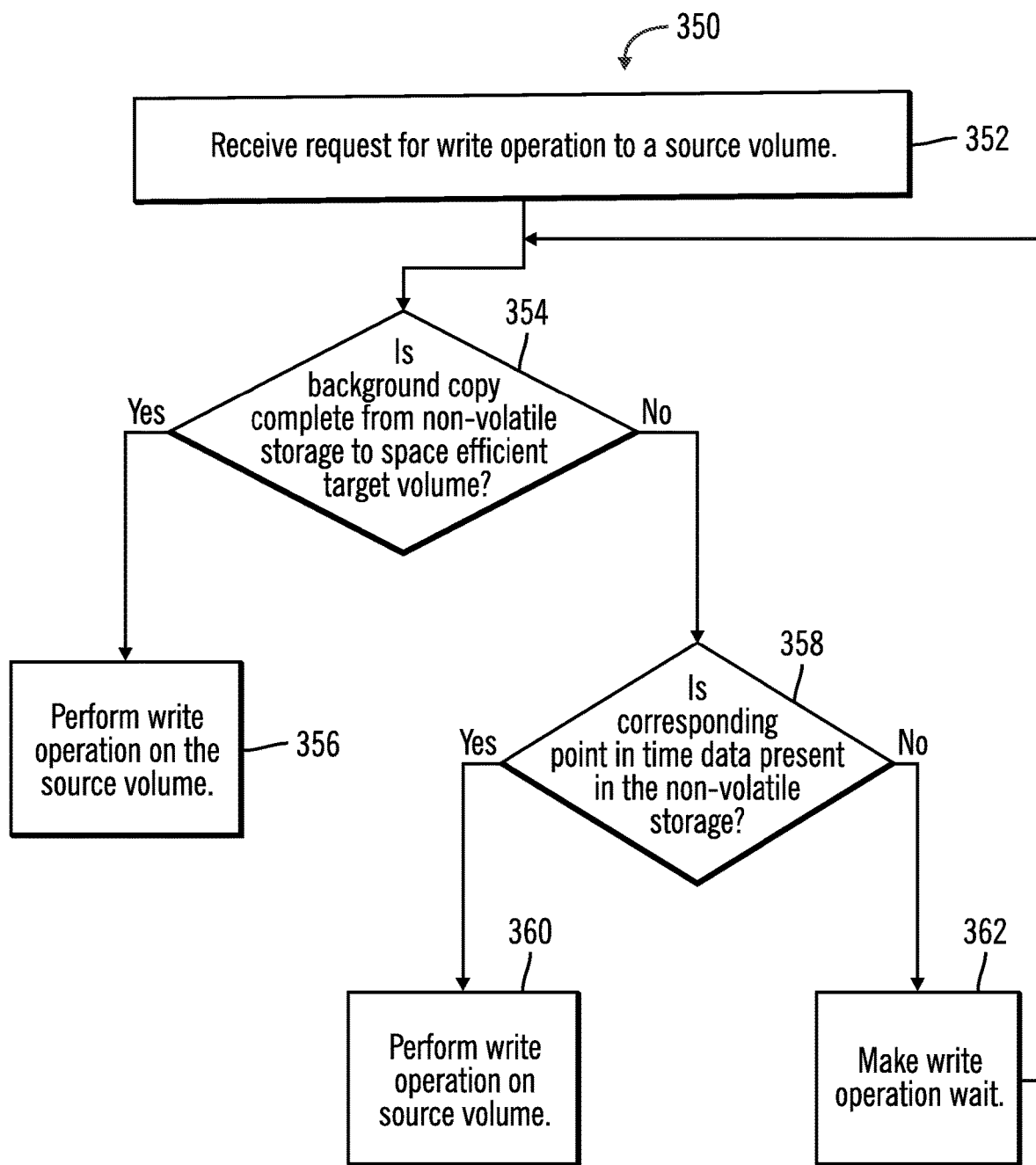
FIG. 3B illustrates flowchart that shows how responses are made to a request received for a write operation, in accordance with certain embodiments.

FIG. 3B illustrates a flowchart 350 that shows how responses are made to a request received for a write operation, in accordance with certain embodiments. The operations shown in FIG. 3B may be implemented in the storage controller 102 and may be performed by additional applications besides the point in time copy application 108 and the background process 116 that may be implemented in the storage controller 102.

Control starts at block 352 in which a request is received for a write operation to a source volume. A determination is made (at block 354) as to whether the background copy from the non-volatile storage 114 to the space efficient target volume 112 has been completed. If so ("Yes" branch from block 354), control proceeds to block 356 and the write operation is performed on the source volume.

If at block 354 it is determined that background copy from the non-volatile storage 114 to the space efficient target volume 112 has not been completed ("No branch from block 354) control proceeds to block 358 where a determination is made as to whether the corresponding point in time data is present in the non-volatile storage 114. If so ("Yes" branch from block 358), the write operation is performed (block 360) on the source volume. If not ("No" branch from block 358) then the request for the write operation is made (at block 362) to wait and control returns to block 354.

Therefore, FIG. 3B illustrates certain embodiments that show how responses are made to a request received for a write operation.

Figure 4:
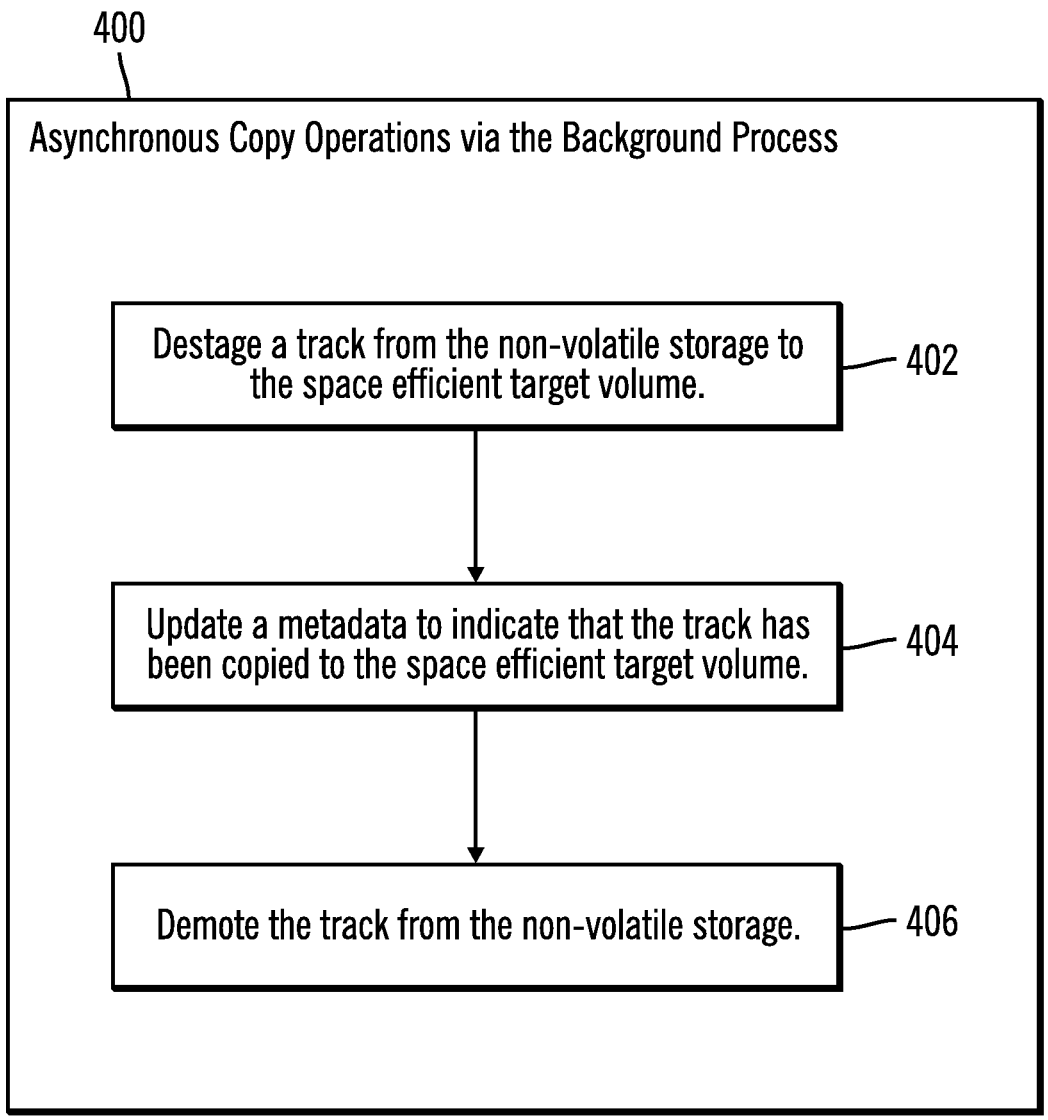
FIG. 4 illustrates a flowchart that shows how asynchronous copy operations are performed via the background process, in accordance with certain embodiments.

FIG. 4 illustrates a flowchart that shows how asynchronous copy operations are performed via the background process 116, in accordance with certain embodiments implemented in the storage controller 102.

Control starts at block 402, in which a track is destaged from the non-volatile storage 114 to the space efficient target volume 112. The bitmap metadata 122 is updated (block 404) to indicate that the track has been copied to the space efficient target volume 112. Other updates to the metadata 120 including the metadata indicators 124 may also be made to reflect the allocation of space in the space efficient target volume 112. The track is then demoted (at block 406) from the non-volatile storage 114.

Therefore, FIG. 4 illustrates certain embodiments in which tracks are destaged form the non-volatile storage 114 to the space efficient target volumes 112 and after updates to the bitmap metadata 122, the tracks are demoted (i.e., deleted) from the non-volatile storage 114 to free up space in the non-volatile storage 114.

Figure 5:
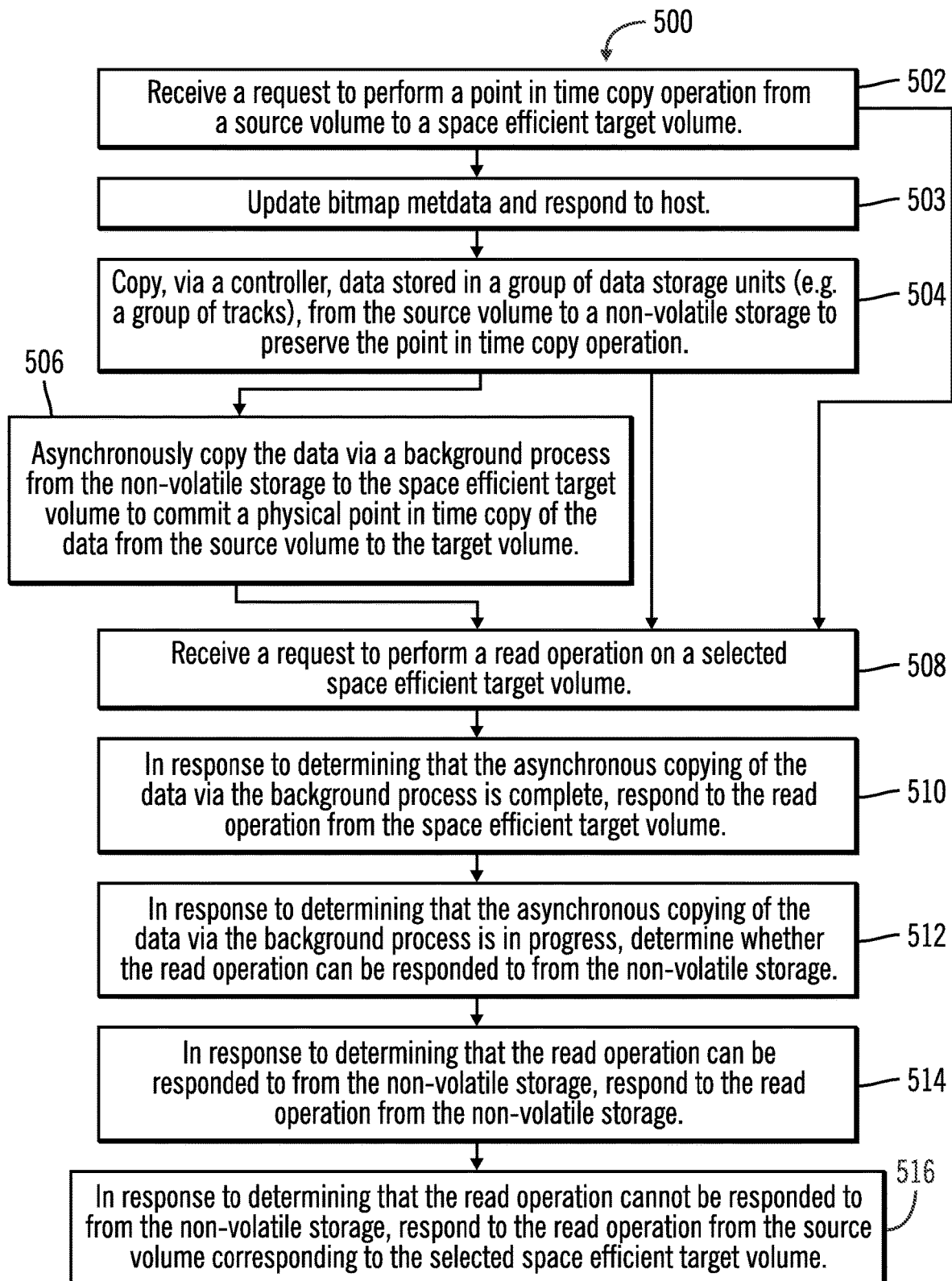
FIG. 5 illustrates a flowchart that shows certain operations related to point in time copy operations, in accordance with certain embodiments.

FIG. 5 illustrates a flowchart 500 that certain operations for point in time copy operations and for reading data, in accordance with certain embodiments. The operations shown in FIG. 5 may be implemented in the storage controller 102.

Control starts at block 502, in which a request is received to perform a point in time copy operation from a source volume 110 to a space efficient target volume 112. A controller 102 updates (at block 503) the bitmap metadata 122 to indicate tracks that are to copied as a result of the point in time copy operation, and in certain embodiments may respond to the host 104 that the host 104 does not have to wait for completion of the point in time copy operation.

The controller 102 then copies (block 504) data stored in a group of data storage units (e.g., a group of tracks) from the source volume 110 to a non-volatile storage 114 to preserve the point in time copy operation.

Subsequently, a background process asynchronously copies (at block 506) the data from the non-volatile storage 114 to the space efficient target volume 112 to commit a physical point in time copy of the data from the source volume 110 to the target volume 112.

In certain embodiments, control may also proceed from blocks 502, 504, or 506 to block 508, in which a request is received to perform a read operation on a selected space efficient target volume 112. It may be noted, that the request to perform the read operation may arrive at any time including times during which the preservation stage 206 of the point in time copy is in progress. At block 510, in response to determining that the asynchronous copying of the data via the background process is complete, the read operation is responded to from the space efficient target volume 112.

In certain additional embodiments, control proceeds to block 512, in which in response to determining that the asynchronous copying of the data via the background process is in progress, a determination is made as to whether the read operation can be responded to from the non-volatile storage 112. In response to determining that the read operation can be responded to from the non-volatile storage 112, the read operation is responded to (block 514) from the non-volatile storage 112. Control proceeds to block 516, where in response to determining that the read operation cannot be responded to from the non-volatile storage 114, the read operation is responded to from the source volume 110 corresponding to the selected space efficient target volume 112.

FIG. 6 illustrates a block diagram 600 with programmatic steps that show single track grouping for source destage intercept in case of standard volumes and track space efficient target volumes, in accordance with certain embodiments.

In FIG. 6, it can be seen that during source destage intercept when the target is a track space efficient volume, single track stages and single track destages are performed, in situations where there is a limitation with track space efficient volumes that grouping of tracks is not allowed for stages or destages.

Figure 7:
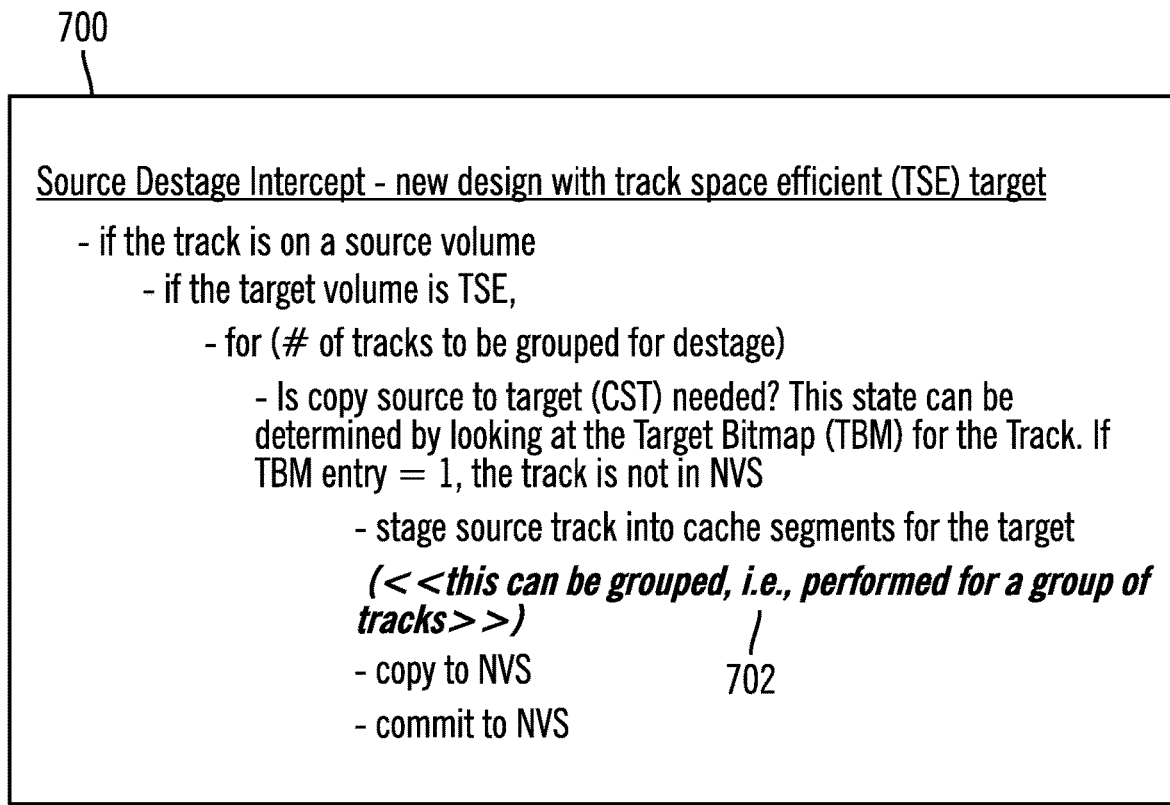
FIG. 7 illustrates a block diagram with programmatic steps that show how writing is performed to non volatile storage for a group of tracks in case of space efficient target volumes, in accordance with certain embodiments.

FIG. 7 illustrates a block diagram 700 with programmatic steps that show how writing is performed to non volatile storage for a group of tracks in case of track space efficient target volumes, in accordance with certain embodiments. In FIG. 7 it can be seen that the write to the non volatile storage can be performed for a group of tracks as shown via reference numeral 702.

Therefore, FIGS. 1, 2, 3A, 3B, 4, 5, 6, 7 illustrate certain embodiments in which a non-volatile storage 114 is used to keep in a preservation stage 206, a temporary copy (e.g., a logical copy) of data that are to undergo point in time copy operations from source volumes 110 to space efficient target volumes 112. The point in time copy operations are preserved in the non-volatile storage 114 by copying a group of tracks. Subsequently, at a later time, in a commit stage 208 the temporary copy is copied over asynchronously via a background process to the space efficient volume 114 to commit a physical point in time copy of the data from the source volume to the target volume.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RE, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or Hocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
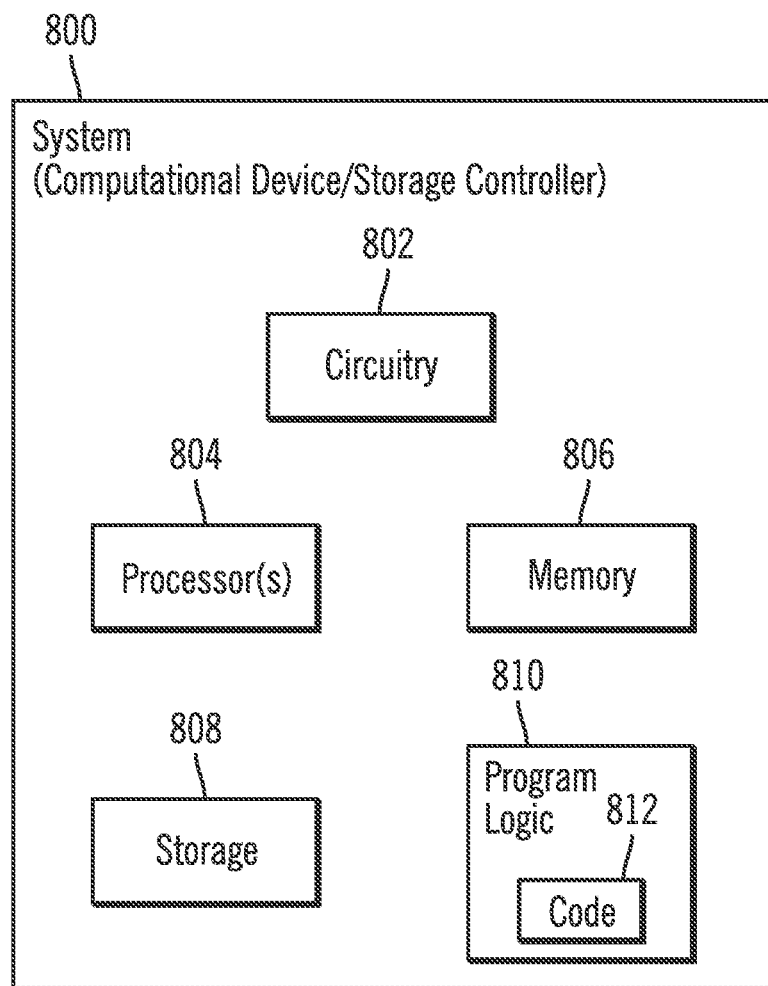
FIG. 8 illustrates a block diagram of a computational system that shows certain elements that may be included in at least the storage controllers of FIG. 1, in accordance with certain embodiments.

FIG. 8 illustrates a block diagram that shows certain elements that may be included in the storage controller 102 in accordance with certain embodiments. The system 800 may comprise the storage controller 102 and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefor while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* Java is a trademark or registered trademark of Oracle and/or its affiliates.

What is claimed:

1. A system, comprising:
a memory; and
a processor coupled to the memory, wherein the processor performs operations, the operations comprising:
in response to receiving a request from a host to perform a point in time copy operation from a source volume to a space efficient target volume, performing a first set of operations, the first set of operations comprising:
updating a bitmap metadata to indicate tracks to be copied for the point in time copy operation, and in response to updating the bitmap metadata sending an indication to the host that the point in time copy operation is complete even though a corresponding physical point in time copy of data stored in the tracks has not committed; and
in response to updating the bitmap metadata, copying, by using the bitmap metadata, data stored in the tracks indicated in the bitmap metadata, from the source volume to a non-volatile storage to preserve the point in time copy operation; and
subsequent to completion of the first set of operations, performing a second set of operations, comprising asynchronously copying, via a background process, the data copied in the first set of operations to the non-volatile storage, from the non-volatile storage to the space efficient target volume to perform a commit of the physical point in time copy of the data from the source volume to the space efficient target volume, wherein point in time copy operations are preserved in the non-volatile storage via the first set of operations by copying a group of tracks to a temporary copy in the non-volatile storage, and subsequently in a commit stage that comprises the second set of operations, the temporary copy is copied over asynchronously via the background process to the space efficient target volume to commit the physical point in time copy of the data from the source volume to the space efficient target volume.

2. The system of claim 1, wherein the copying from the source volume to the non-volatile storage avoids performing of operations to allocate space in the space efficient target volume before responding to the request that the point in time operation is complete, and wherein performing of operations to allocate space in the space efficient target volume is performed while asynchronously copying the data via the background process from the non-volatile storage to the space efficient target volume.

3. The system of claim 1, wherein during a destage intercept when a target is a track space efficient volume, single track stages and single track destages are performed, in response to determining that there is a limitation with track space efficient volumes that grouping of tracks is not allowed for stages or destages.

4. The system of claim 1, wherein the asynchronous copying of the data via the background process comprises:
destaging a track from the non-volatile storage to the space efficient target volume;
updating metadata to indicate that the track has been copied to the space efficient target volume, and to reflect allocation of space in the space efficient target volume; and
demoting the track from the non-volatile storage; and
in response to receiving a request to perform a write operation on a source volume performing:
in response to determining that the asynchronous copying of the data via the background process is not complete and a corresponding point in time data is present in the non-volatile storage, performing the write operation on the source volume;
in response to determining that the asynchronous copying of the data via the background process is not complete and a corresponding point in time data is not present in the non-volatile storage, making the write operation wait; and
in response to determining that the asynchronous copying of the data via the background process is complete, performing the write operation on the source volume.

5. The system of claim 1, the operations further comprising:
receiving a request to perform a read operation on a selected space efficient target volume;
determining whether the asynchronous copying of the data via the background process is complete;
in response to determining that the asynchronous copying of the data via the background process is complete, responding to the read operation from the space efficient target volume;
in response to determining that the asynchronous copying of the data via the background process is in progress, determining whether the read operation can be responded to from the non-volatile storage;
in response to determining that the read operation can be responded to from the non-volatile storage, responding to the read operation from the non-volatile storage; and
in response to determining that the read operation cannot be responded to from the non-volatile storage, responding to the read operation from the source volume corresponding to the selected space efficient target volume.

6. The system of claim 1, wherein the copying of the data from the source volume to the non-volatile storage takes less time in comparison to directly copying the data from the source volume to the space efficient target volume, and wherein the asynchronous copying of the data via the background process takes more time than the copying of the data from the source volume to the non-volatile storage.

7. The system of claim 1, wherein the background process executes in the system, and wherein the non-volatile storage and the bitmap metadata are included in the system.

8. The system of claim 7, wherein the copying of the data from the source volume to the non-volatile storage takes less time in comparison to directly copying the data from the source volume to the space efficient target volume, and wherein the asynchronous copying of the data via the background process takes more time than the copying of the data from the source volume to the non-volatile storage.

9. A computer program product, the computer program product comprising a non-transitory computer readable storage medium having computer readable program code embodied therewith, the computer readable program code configured to perform operations on a controller, the operations comprising:

in response to receiving, by the controller, a request from a host to perform a point in time copy operation from a source volume to a space efficient target volume, performing a first set of operations, the first set of operations comprising:

updating a bitmap metadata to indicate tracks to be copied for the point in time copy operation, and in response to updating the bitmap metadata sending an indication to the host that the point in time copy operation is complete even though a corresponding physical point in time copy of data stored in the tracks has not committed; and in response to updating the bitmap metadata, copying, via the controller, by using the bitmap metadata, data stored in the tracks indicated in the bitmap metadata, from the source volume to a non-volatile storage to preserve the point in time copy operation; and subsequent to completion of the first set of operations, performing a second set of operations, comprising asynchronously copying, via a background process, the data copied in the first set of operations to the non-volatile storage, from the non-volatile storage to the space efficient target volume to perform a commit of the physical point in time copy of the data from the source volume to the space efficient target volume, wherein point in time copy operations are preserved in the non-volatile storage via the first set of operations by copying a group of tracks to a temporary copy in the non-volatile storage, and subsequently in a commit stage that comprises the second set of operations, the temporary copy is copied over asynchronously via the background process to the space efficient target volume to commit the physical point in time copy of the data from the source volume to the space efficient target volume.

10. The computer program product of claim 9, wherein the copying from the source volume to the non-volatile storage avoids performing of operations to allocate space in the space efficient target volume before responding to the request that the point in time operation is complete, and wherein performing of operations to allocate space in the space efficient target volume is performed while asynchronously copying the data via the background process from the non-volatile storage to the space efficient target volume.

11. The computer program product of claim 9, wherein during a destage intercept when a target is a track space efficient volume, single track stages are performed, in response to determining that there is a limitation with track space efficient volumes that grouping of tracks is not allowed for stages or destages.

12. The computer program product of claim 9, wherein the asynchronous copying of the data via the background process comprises:

destaging a track from the non-volatile storage to the space efficient target volume;

updating metadata to indicate that the track has been copied to the space efficient target volume, and to reflect allocation of space in the space efficient target volume; and demoting the track from the non-volatile storage; and in response to receiving a request to perform a write operation on a source volume performing:

in response to determining that the asynchronous copying of the data via the background process is not complete and a corresponding point in time data is present in the non-volatile storage, performing the write operation on the source volume;

in response to determining that the asynchronous copying of the data via the background process is not complete and a corresponding point in time data is not present in the non-volatile storage, making the write operation wait; and in response to determining that the asynchronous copying of the data via the background process is complete, performing the write operation on the source volume.

13. The computer program product of claim 9, the operations further comprising:

receiving a request to perform a read operation on a selected space efficient target volume;

determining whether the asynchronous copying of the data via the background process is complete;

in response to determining that the asynchronous copying of the data via the background process is complete, responding to the read operation from the space efficient target volume;

in response to determining that the asynchronous copying of the data via the background process is in progress, determining whether the read operation can be responded to from the non-volatile storage;

in response to determining that the read operation can be responded to from the non-volatile storage, responding to the read operation from the non-volatile storage; and in response to determining that the read operation cannot be responded to from the non-volatile storage, responding to the read operation from the source volume corresponding to the selected space efficient target volume.

14. The computer program product of claim 9, wherein the copying of the data from the source volume to the non-volatile storage takes less time in comparison to directly copying the data from the source volume to the space efficient target volume, and wherein the asynchronous copying of the data via the background process takes more time than the copying of the data from the source volume to the non-volatile storage.

15. The computer program product of claim 9, wherein the background process executes in the controller, and wherein the non-volatile storage and the bitmap metadata are included in the controller.

16. The computer program product of claim 15, wherein the copying of the data from the source volume to the non-volatile storage takes less time in comparison to directly copying the data from the source volume to the space efficient target volume, and wherein the asynchronous copying of the data via the background process takes more time than the copying of the data from the source volume to the non-volatile storage.

17. A storage controller controlling a source volume and a space efficient target volume, wherein the storage controller is coupled to a host, the storage controller, comprising:

a non-volatile storage;

a processor coupled to the non-volatile storage, wherein the processor performs operations, the operations comprising:

in response to receiving a request from a host to perform a point in time copy operation from the source volume to the space efficient target volume, performing a first set of operations, the first set of operations comprising:

updating a bitmap metadata to indicate tracks to be copied for the point in time copy operation, and in response to updating the bitmap metadata sending an indication to the host that the point in time copy operation is complete even though a corresponding physical point in time copy of data stored in the tracks has not committed; and in response to updating the bitmap metadata, copying by using the bitmap metadata, data stored in the tracks indicated in the bitmap metadata, from the source volume to a non-volatile storage to preserve the point in time copy operation; and subsequent to completion of the first set of operations, performing a second set of operations, comprising asynchronously copying, via a background process, the data copied in the first set of operations to the non-volatile storage, from the non-volatile storage to the space efficient target volume to perform a commit of the physical point in time copy of the data from the source volume to the space efficient target volume, wherein point in time copy operations are preserved in the non-volatile storage via the first set of operations by copying a group of tracks to a temporary copy in the non-volatile storage, and subsequently in a commit stage that comprises the second set of operations, the temporary copy is copied over asynchronously via the background process to the space efficient target volume to commit the physical point in time copy of the data from the source volume to the space efficient target volume.

18. The storage controller of claim 17, wherein the copying of the data from the source volume to the non-volatile storage takes less time in comparison to directly copying the data from the source volume to the space efficient target volume, and wherein the asynchronous copying of the data via the background process takes more time than the copying of the data from the source volume to the non-volatile storage.

19. The storage controller of claim 17, wherein the background process executes in the storage controller, and the bitmap metadata is included in the storage controller.

20. The storage controller of claim 19, wherein the copying of the data from the source volume to the non-volatile storage takes less time in comparison to directly copying the data from the source volume to the space efficient target volume, and wherein the asynchronous copying of the data via the background process takes more time than the copying of the data from the source volume to the non-volatile storage.

* * * * *